United States Patent [19]

Morgan

[11] Patent Number: 4,500,506
[45] Date of Patent: Feb. 19, 1985

[54] PRODUCTION OF CALCIUM HYPOCHLORITE

[75] Inventor: David L. Morgan, Johannesburg, South Africa

[73] Assignee: Klipfontein Organic Products Corporation Limited, Transvaal, South Africa

[21] Appl. No.: 538,066

[22] Filed: Sep. 30, 1983

Related U.S. Application Data

[63] Continuation of Ser. No. 459,728, Jan. 20, 1983, abandoned, which is a continuation of Ser. No. 356,537, Mar. 9, 1982, abandoned.

[30] Foreign Application Priority Data

Mar. 9, 1981 [ZA] South Africa ............... 81/1550

[51] Int. Cl.³ .............................................. C01B 11/06
[52] U.S. Cl. .................................................... 423/474
[58] Field of Search ........................................ 423/474

[56] References Cited

U.S. PATENT DOCUMENTS

| | | | |
|---|---|---|---|
| 1,583,421 | 5/1926 | Pistor | 423/474 |
| 1,937,230 | 11/1933 | Kitchen | 423/474 |
| 2,441,337 | 5/1946 | Sprauer | 423/474 |
| 3,760,064 | 9/1973 | Droste | 423/474 |
| 3,895,099 | 7/1975 | Sakowski | 423/474 |
| 4,367,209 | 1/1983 | Sakowski et al. | 423/474 |
| 4,399,117 | 8/1983 | Sakowski et al. | 423/474 |
| 4,416,864 | 11/1983 | Wojtowicz | 423/474 |
| 4,428,919 | 1/1984 | Stermole et al. | 423/474 |

FOREIGN PATENT DOCUMENTS 1914939 10/1969 Fed. Rep. of Germany ...... 423/474

Primary Examiner—John Doll
Assistant Examiner—Robert L. Stoll
Attorney, Agent, or Firm—Beveridge, DeGrandi & Kline

[57] ABSTRACT

Neutral calcium hypochlorite is made by producing and separating out from the mother liquor crystals of dibasic calcium hypochlorite; reacting the dibasic calcium hypochlorite with a solution free of insoluble impurities and containing hypochlorite ions to produce hemibasic calcium hypochlorite crystals; separating the crystals of hemibasic calcium hypochlorite from the mother liquor; and converting the hemibasic calcium hypochlorite crystals into neutral calcium hypochlorite.

5 Claims, 1 Drawing Figure

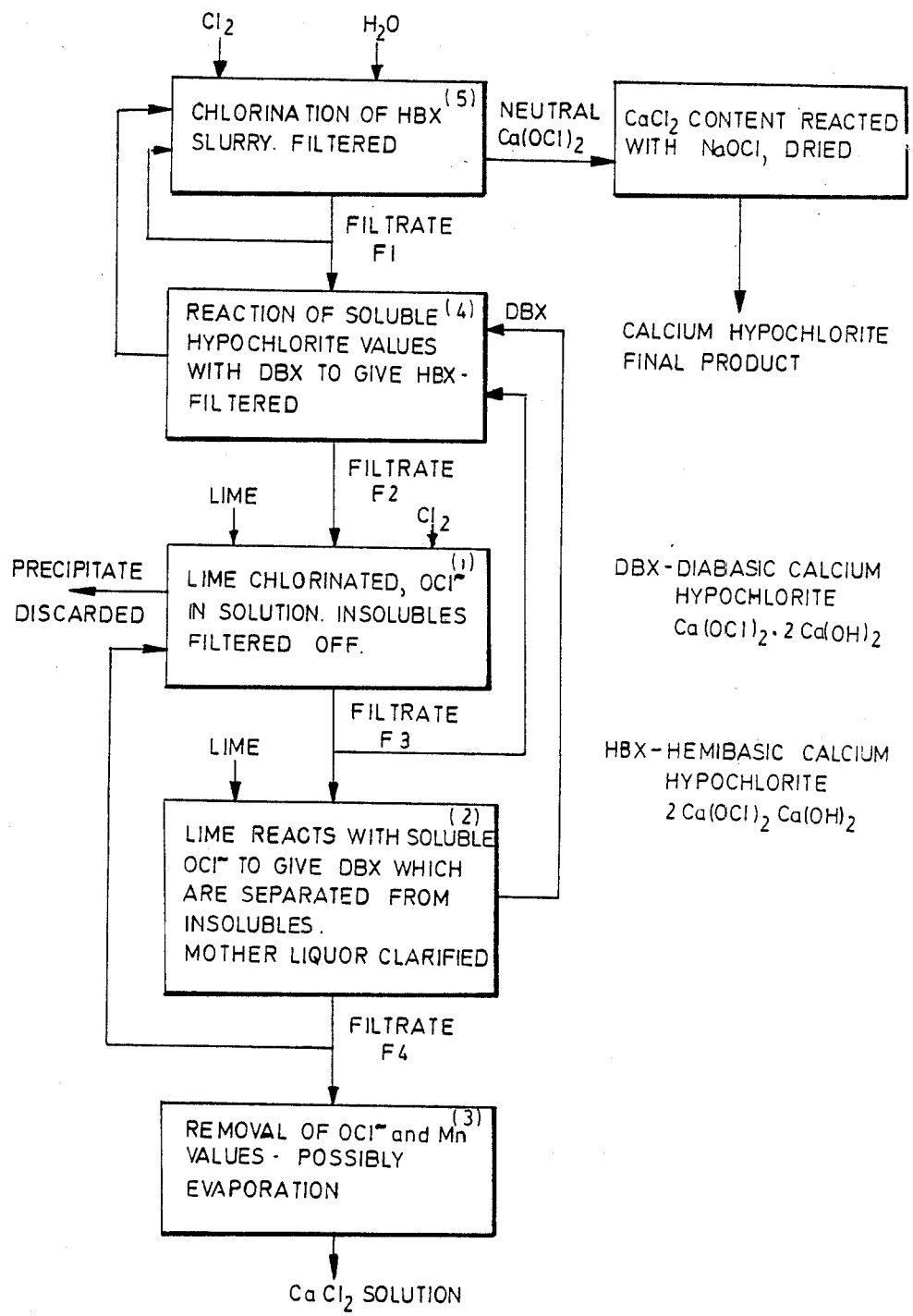

PRODUCTION OF CALCIUM HYPOCHLORITE

REFERENCE TO A RELATED APPLICATION

This is a continuation of my copending application Ser. No. 459,728 filed Jan. 20, 1983, now abandoned, which in turn is a continuation of my copending application Ser. No. 356,537 filed Mar. 9, 1982, now abandoned, which are both relied on herein and incorporated by reference.

This invention relates to calcium hypochlorite and more particularly neutral calcium hypochlorite.

Neutral calcium hypochlorite is used extensively in South Africa, particularly for swimming pool sanitation. It is presently being produced by chlorinating a high quality lime which is expensive. The lime which is readily available is cheaper, but is of poor quality containing iron and other heavy metals, manganese, silica, alumina and other impurities. Iron and other heavy metals encourage the decomposition of the neutral calcium hypochlorite while the manganese produces unwanted color contamination. Other impurities are deleterious because they dilute the calcium hypochlorite content in the final product and make the product slower to dissolve.

It is an object of the present invention to provide a method of producing crystals of neutral calcium hypochlorite which may use lime of poor quality as a starting material.

According to the present invention, there is provided a method of making neutral calcium hypochlorite including the steps of:

(i) reacting lime with a solution containing hypochlorite ions ($OCl^-$) to produce crystals of dibasic calcium hypochlorite, mother liquor and insoluble impurities;

(ii) separating the crystals of dibasic calcium hypochlorite from the mother liquor and insoluble impurities;

(iii) reacting the dibasic calcium hypochlorite with a solution free of insoluble impurities and containing hypochlorite ions ($OCl^-$) to produce hemibasic calcium hypochlorite crystals;

(iv) separating the crystals of hemibasic calcium hypochlorite from the mother liquor; and (v) converting the hemibasic calcium hypochlorite crystals into neutral calcium hypochlorite.

The conversion of hemibasic calcium hypochlorite to neutral calcium hypochlorite may be achieved by many methods known in the art, for example by forming a slurry of the hemibasic calcium hypochlorite, chlorinating this slurry to produce neutral calcium hypochlorite and separating this neutral calcium hypochlorite from the slurry. The neutral calcium hypochlorite so produced will contain a certain amount of calcium chloride. This may be removed by reacting the product with sodium hypochlorite. A double decomposition reaction takes place in which calcium hypochlorite may then be dried to produce the final marketable product.

The various filtrates may be re-cycled to conserve hypochlorite values and to enable a more concentrated calcium chloride solution to be produced.

The crystals of dibasic calcium hypochlorite are preferably produced in a two-stage process. The first stage involves chlorinating a slurry of lime and separating the insoluble impurities from the mother liquor. The mother liquor is reacted in a second stage with further lime to produce the crystals of dibasic calcium hypochlorite under conditions encouraging the growth of large crystals which may then be separated from the fine insoluble impurities. The insoluble impurities will be finer than the crystals of dibasic calcium hypochlorite. Consequently, separation methods must be used which achieve separation of these two precipitates. These methods are known in the art and include wet size classification methods such as differential settling particularly against an upward flow of clarified mother liquor, hydrocyclone and centrifugal classifiers; flotation of the fine impurities; and filtration followed by drying and then dry classification methods such as sieving and air-classification. All these methods are well known in the art.

Large crystals of dibasic calcium hypochlorite are produced by methods such as seeding the medium with seed crystals or using a continuous process where seed crystals are continuously being produced. It is important that large, easily separable crystals of dibasic calcium hypochlorite be produced. This enables these crystals to be separated from the fine insoluble impurities. The dibasic calcium hypochlorite crystals so separated are of good quality.

The dibasic calcium hypochlorite crystals are filtered from the mother liquor which contains substantial quantities of calcium chloride. The mother liquor may be treated to remove the dissolved hypochlorite and manganese values producing a relatively pure calcium chloride solution. Typically, a part of the filtrate from the first stage provides the soluble hypochlorite values for reacting with the dibasic calcium hypochlorite to produce the hemibasic calcium hypochlorite.

The chlorination may be achieved using any known chlorinating agent. The preferred chlorinating agent is chlorine gas.

The lime which is used in this process may be of high quality or poor quality, but clearly the process has greater application for limes of poor quality.

An embodiment of the invention will now be described with reference to the attached flowsheet.

Poor quality lime which is available locally is slurried at stage (1) with water and filtrate from a step further along the process. The slurry is chlorinated with chlorine gas. The insoluble precipitate which forms is filtered off and the filtrate divided into two parts. The one part of the filtrate goes to stage (2) where it is reacted with further lime to produce crystals of dibasic calcium hypochlorite. The crystals of dibasic calcium hypochlorite are separated from the fine, gelatinous insoluble impurities which form, filtered and washed with a little water. The filtrate is divided into two parts—the one part being re-cycled to the chlorination stage (1) and the other part being treated in stage (3) to remove soluble hypochlorite and manganese values producing a solution of calcium chloride.

The crystals of dibasic calcium hypochlorite (from which 80 to 85 percent of the impurities in the original lime have been removed), are used in stage (4) to produce hemibasic calcium hypochlorite. In stage (4) the crystals of dibasic calcium hypochlorite are mixed with filtrate from stage (1) and filtrate from stage (5) to be described hereinafter. The soluble hypochlorite values in the filtrate react with the dibasic calcium hypochlorite to give hemibasic calcium hypochlorite. The hemibasic calcium hypochlorite is removed from the mother liquor by filtration. The filtrate is used in stage (1) in the preparation of the slurry.

The crystals of hemibasic calcium hypochlorite are taken to stage (5) where they are slurried with water and chlorinated to produce crystals of neutral calcium hypochlorite. The crystals of neutral calcium hypochlorite are removed by filtration. Part of the filtrate is used in stage (4) while the remainder is used in producing the slurry for this stage.

The neutral calcium hypochlorite contains calcium chloride. This may be removed by reacting it with a solution of sodium hypochlorite. A double decomposition reaction takes place in which calcium hypochlorite and sodium chloride are produced. The product is dried and in this form is available for commercialisation.

An example of the invention will now be described. Reference is made in this Example to the flowsheet.

EXAMPLE:

Lime (205 g) having an analysis

| | |
|---|---|
| $Ca(OH)_2$ | 96% |
| $CaCO_3$ | 1% |
| $SiO_2$ | 1,6% |
| Mg | 0,5% |
| Mn | 0,28% |
| Fe | 0,21% |
| Al | 0,15% | was slurried up with solution (700 g) containing 4,1% by weight dissolved calcium hypochlorite and 20% by weight calcium chloride and water (500 g). The calcium hypochlorite/calcium chloride solution was obtained after filtering the dibasic calcium hypochlorite crystals in step (2) (see flowsheet). Chlorination was continued to the point where the $Ca(OH)_2$ concentration was about 0,5% and the solution filtered. The filtrate was essentially free of impurities except manganese, which was present as permanganate.

The same lime (205 g) was added to the filtrate in the presence of seed crystals encouraging the growth of large crystals of dibasic calcium hypochlorite. These large crystals were separated from the fine insoluble precipitate present by differential settling and filtration, washed with a little water to give a product composition

| | |
|---|---|
| $Ca(OH)_2$ | 25% |
| $Ca(OCl)_2$ | 26% |
| $CaCl_2$ | 4% |
| $SiO_2$ | 0,04% |
| Mg | 0,02% |
| Mn | 0,002% |
| Fe | 0,01% |
| Al | 0,01% |

These crystals were allowed to react with a further quantity of the filtrate from the initial chlorination to give crystals of hemibasic calcium hypochlorite. After filtration these have the composition

| | |
|---|---|
| $Ca(OH)_2$ | 14,4% |

| -continued | |
|---|---|
| $Ca(OCl)_2$ | 56,0% |
| $CaCl_2$ | 6,1% |
| $SiO_2$ | 0,02% |
| Mg | 0,01% |
| Mn | 0,02% |
| Fe | 0,003% |
| Al | 0,002% | i.e. demonstrating an overall purification of about 96%, except for manganese which is present in the mother liquors.

The hemibasic crystals were slurried with water and then chlorinated with chlorine gas to produce neutral crystals of calcium hypochlorite which were readily separable from the slurry by filtration.

I claim:

1. A method of making neutral calcium hypochlorite including the steps of:
   (i) chlorinating a slurry of lime which contains impurities including iron, other heavy metals, manganese, silica and alumina to form a mother liquor and separating the insoluble impurities from the mother liquor to give a solution containing hypochlorite ions and free of insoluble impurities;
   (ii) reacting lime which contains impurities including iron, other heavy metals, manganese, silica and alumina with the solution of step (i) in the presence of seed crystals to produce large crystals of dibasic calcium hypochlorite, together with mother liquor and insoluble impurities in a slurry; the crystals of dibasic hypochlorite being large and easily separable, thereby enabling said crystals to be separated from the fine insoluble impurities that are finer than the large crystals of dibasic calcium hypochlorite; and
   (iii) without treating the slurry at any stage to precipitate out the iron impurities; separating the large crystals of dibasic calcium hypochlorite from the mother liquor and also separating the large dibasic calcium hypochlorite crystals from the fine insoluble impurities;
   (iv) reacting the dibasic calcium hypochlorite with the solution of step (i) to produce hemibasic calcium hypochlorite crystals;
   (v) separating the crystals of hemibasic calcium hypochlorite from the mother liquor; and
   (vi) converting the hemibasic calcium hypochlorite crystals into neutral calcium hypochlorite.

2. A method according to claim 1 wherein chlorination is achieved with chlorine gas.

3. A method according to claim 1 wherein the hemibasic calcium hypochlorite is converted to neutral calcium hypochlorite by forming a slurry of the hemibasic calcium hypochlorite, chlorinating the slurry to produce neutral calcium hypochlorite and separating the neutral calcium hypochlorite from the slurry.

4. A method according to claim 3 wherein chlorination is achieved with chlorine gas.

5. A method according to claim 3 wherein the neutral calcium hypochlorite is reacted with sodium hypochlorite to reduce the calcium chloride content thereof.

* * * * *